(12) United States Patent
Nicgorski et al.

(10) Patent No.: US 9,476,426 B2
(45) Date of Patent: Oct. 25, 2016

(54) VIBRATION ISOLATING ENGINE COOLING FAN

(75) Inventors: Dana Nicgorski, Stoneham, MA (US);
Friedrich Meyer, Karlsruhe (DE);
Michael Strupp, Durmersheim (DE);
William M. Stevens, Maynard, MA (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 1035 days.

(21) Appl. No.: 13/593,696

(22) Filed: Aug. 24, 2012

(65) Prior Publication Data

US 2013/0216376 A1    Aug. 22, 2013

Related U.S. Application Data

(60) Provisional application No. 61/527,945, filed on Aug. 26, 2011.

(51) Int. Cl.
*F04D 19/00* (2006.01)
*F04D 29/66* (2006.01)
(Continued)

(52) U.S. Cl.
CPC ........... *F04D 19/002* (2013.01); *F04D 29/668* (2013.01); *H02K 5/24* (2013.01); *H02K 7/14* (2013.01)

(58) Field of Classification Search
CPC ...... F04D 19/002; F04D 29/28; F04D 29/32; F04D 29/325; F04D 29/329; F04D 29/668; H02K 5/24
See application file for complete search history.

(56) References Cited

U.S. PATENT DOCUMENTS 3,303,995 A    2/1967   Boeckel
4,169,693 A *  10/1979  Brubaker ............... B60K 11/00
                                               416/169 A (Continued)

FOREIGN PATENT DOCUMENTS

CN    102086888 A    6/2011
DE      4205458 A1   8/1993

(Continued)

OTHER PUBLICATIONS

International Search Report and Written Opinion corresponding to PCT Application No. PCT/US2012/052314, mailed Oct. 22, 2013 (14 pages).

(Continued)

*Primary Examiner* — Craig Kim
*Assistant Examiner* — Michael Sehn
(74) *Attorney, Agent, or Firm* — Maginot Moore & Beck LLP

(57) ABSTRACT

An axial fan assembly includes a hub, a plurality of connection structures, and a plurality of isolated members. The hub is rotatable about an axis of rotation and includes a radially extending face and a cylindrical portion extending axially from the face. The face includes a radially inner face portion and a radially outer face portion. The plurality of connection structures extends radially inwardly from the radially outer face portion and extends radially outward from the radially inner face portion. The plurality of isolated members extends radially outwardly from the radially inner face portion and is isolated from the plurality of connection structures and from the radially outer face portion by a plurality of slots.

16 Claims, 19 Drawing Sheets

(51) Int. Cl.
*H02K 5/24* (2006.01)
*H02K 7/14* (2006.01)

(56) References Cited

U.S. PATENT DOCUMENTS

| | | |
|---|---|---|
| 5,193,981 A | 3/1993 | Scheidel et al. |
| 6,830,434 B2 * | 12/2004 | Kondo .................. F04D 29/329 416/169 A |
| 7,455,502 B2 | 11/2008 | Spaggiari |
| 7,585,159 B2 | 9/2009 | Caplan et al. |
| 8,157,524 B2 | 4/2012 | Nicgorski et al. |
| 2008/0286093 A1 | 11/2008 | Bauer, Jr. |
| 2011/0135494 A1 | 6/2011 | Nicgorski et al. |

FOREIGN PATENT DOCUMENTS

| | | |
|---|---|---|
| DE | 19504970 A1 | 8/1996 |
| EP | 1447898 A1 | 8/2004 |
| EP | 2333347 A2 | 6/2011 |
| WO | 2004097226 A1 | 11/2004 |

OTHER PUBLICATIONS

English Translation of Chinese Search Report and Written Opinion corresponding to Chinese Application 201280041563.4, received Dec. 2, 2015 (6 pages).

* cited by examiner

VIBRATION ISOLATING ENGINE COOLING FAN

This application claims the benefit of U.S. Provisional Application Ser. No. 61/527,945, filed Aug. 26, 2011, the disclosure of which is incorporated herein by reference in its entirety.

FIELD

This patent relates to axial flow fans and particularly to axial flow fans for use with automotive cooling systems.

BACKGROUND

Typical automotive engine cooling fan assemblies include an axial flow fan coupled to the rotating portion of an electric motor. The fan includes a hub and a plurality of fan blades. The hub is connected to the rotating portion of the motor with screws, clips, or other fastening methods. Additionally, the hub may be press-fit onto the rotating portion of the motor. The fan blades radially extend away from the hub. Rotation of the fan by the electric motor causes the fan to generate an airflow, which is generally parallel to an axis of rotation of the fan. The airflow is used to remove heat from the automobile's powertrain and/or the air conditioning condenser of the automobile.

When the electric motor rotates the fan, the fan exhibits at least some level of noise and vibration originating from the electric motor. The noise is caused by numerous factors including the type of electric motor and the design of the fan. In at least some instances, noise is caused by, for example, motor electromagnetic forces exciting resonances of the motor and/or the fan. The noise emitted by the fan due to the electric motor typically does not impact the magnitude of airflow generated by the fan; however, users of the fan typically find levels of noise above a certain threshold to be bothersome.

It would therefore be desirable for an axial flow fan to generate an airflow without generating bothersome levels of noise due to the electric motor.

SUMMARY

According to one embodiment of the disclosure, an axial fan assembly includes a hub, a plurality of connection structures, and a plurality of isolated members. The hub is rotatable about an axis of rotation and includes a radially extending face and a cylindrical portion extending axially from the face. The face includes a radially inner face portion and a radially outer face portion. The plurality of connection structures extends radially outwardly from the radially inner face portion and extends radially inwardly from the radially outer face portion. The plurality of isolated members extends radially outwardly from the radially inner face portion and is isolated from the plurality of connection structures and the radially outer face portion by a plurality of slots.

According to another embodiment of the disclosure, an axial fan assembly includes a hub, a plurality of connection structures, and a plurality of slots. The hub is rotatable about an axis of rotation and includes a radially extending face and a cylindrical portion extending axially from the face. The face includes a radially inner face portion and a radially outer face portion. The plurality of connection structures extends radially outwardly from the radially inner face portion and extends radially inwardly from the radially outer face portion. The plurality of slots extends through the face and extends radially and circumferentially to define a plurality of isolated members. Each isolated member of the plurality of isolated members is directly connected to one of the radially inner face portion and the radially outer face portion. Each isolated member of the plurality of isolated members is isolated from the plurality of connection structures and isolated from one of the radially inner face portion and the radially outer face portion.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
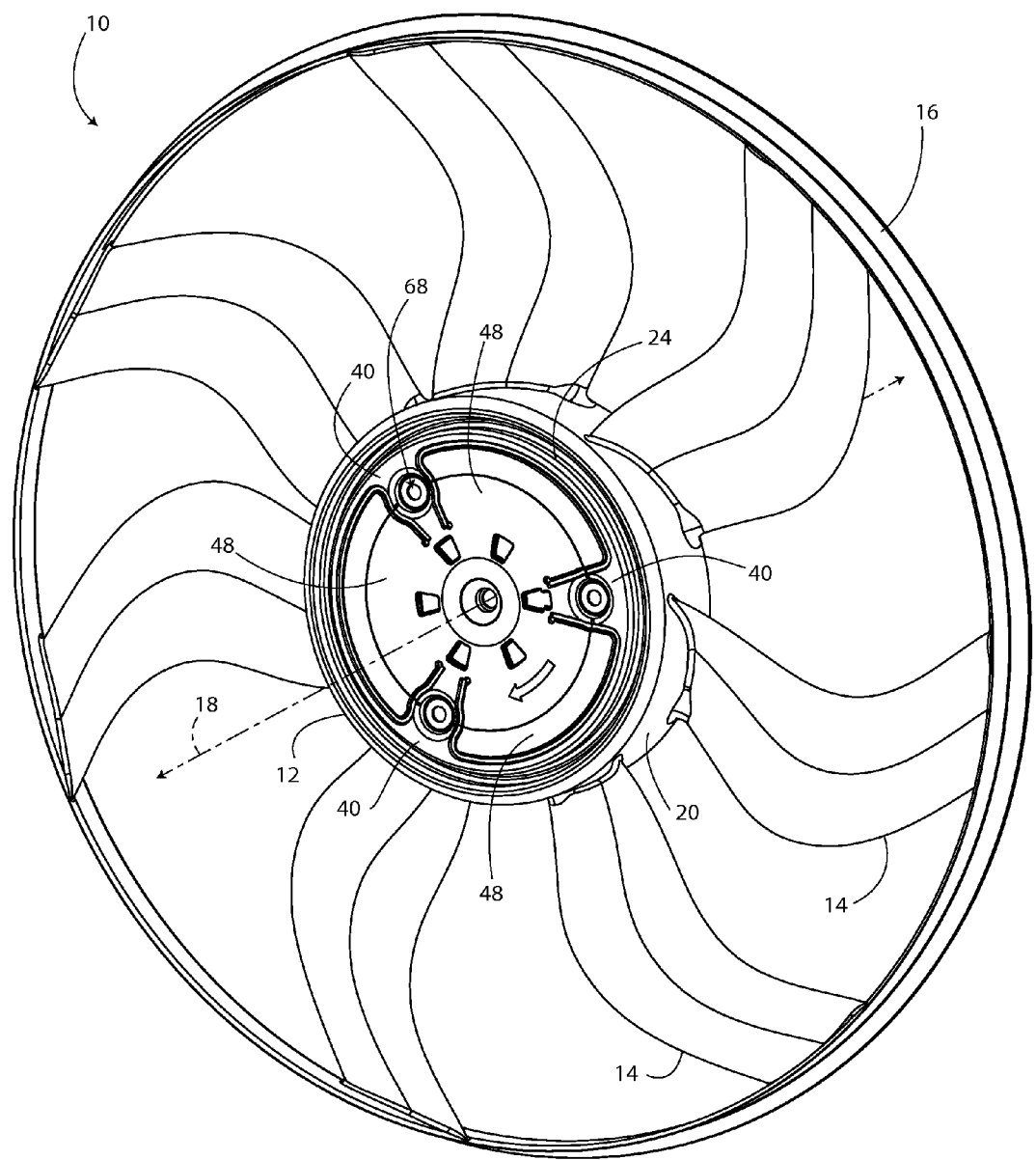
FIG. 1 is a front perspective view of an axial fan as described herein.

For the purpose of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Figure 2:
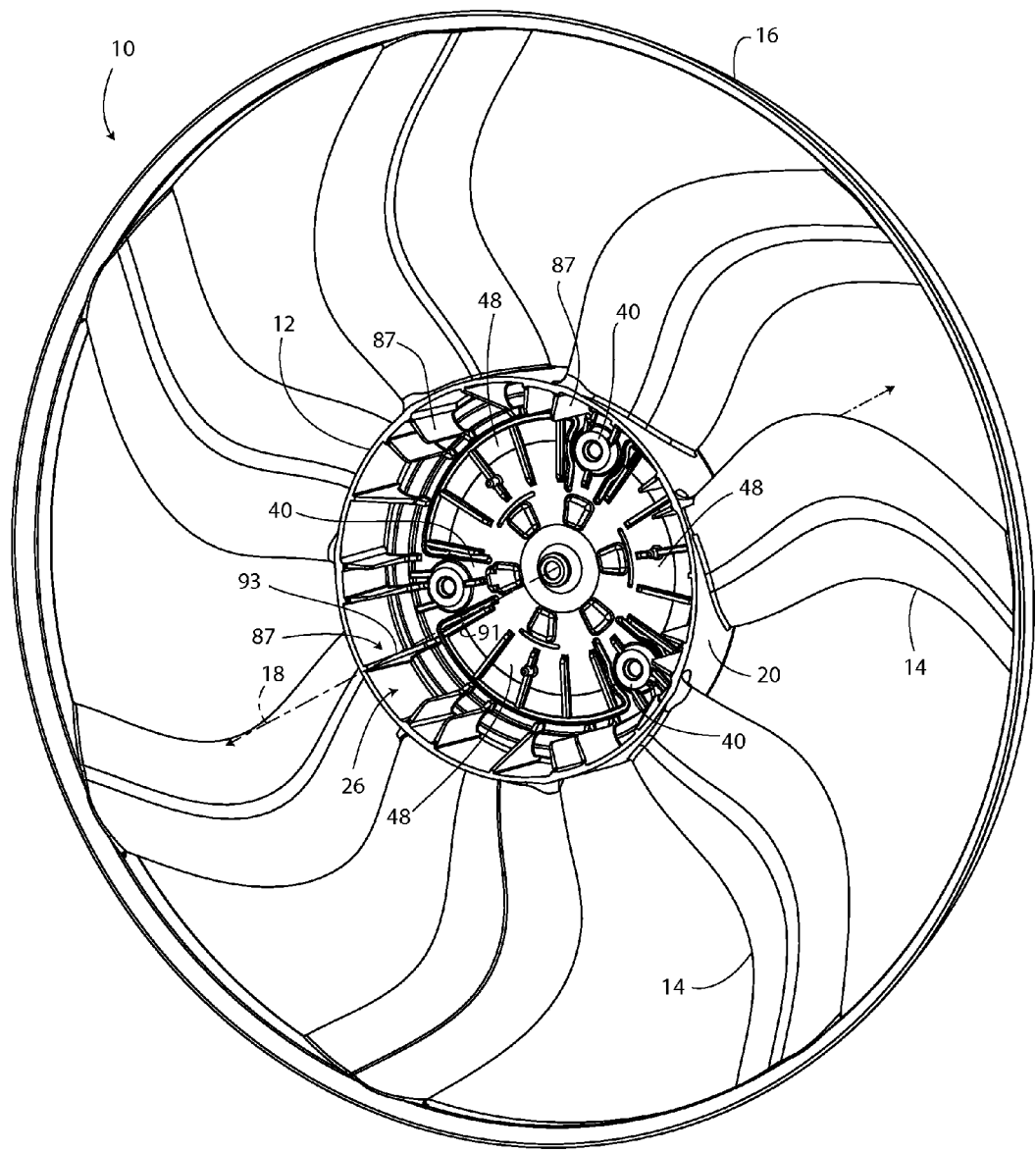
FIG. 2 is a rear perspective view of the axial fan of FIG. 1.

As shown in FIGS. 1 and 2, an axial fan assembly 10 includes a hub 12, blades 14 extending radially outwardly from the hub, and a band 16 connected to the tips of each of the blades. Rotation of the fan 10 causes the blades 14 to generate an airflow, which is coaxial with an axis of rotation 18 of the fan. In one typical application, the fan 10 is positioned so that the airflow is directed through a heat exchanger of a liquid cooled engine (not shown). The fan 10 includes features that reduce the noise that is emitted by the rotating fan.

With reference to FIG. 1, the hub 12 includes a cylindrical portion 20 that extends axially from a radially extending face 24. The cylindrical portion 20 extends axially rearward from the face 24, in a direction parallel to the axis of rotation 18, about which the hub is rotatable. The hub 12 defines a hub cavity 26 (FIGS. 2 and 4) in which at least a portion of an electric motor 177 (see FIG. 6) is positioned. The hub 12 and each other portion of the fan 10 are typically formed from injection molded thermoplastic.

Figure 3:
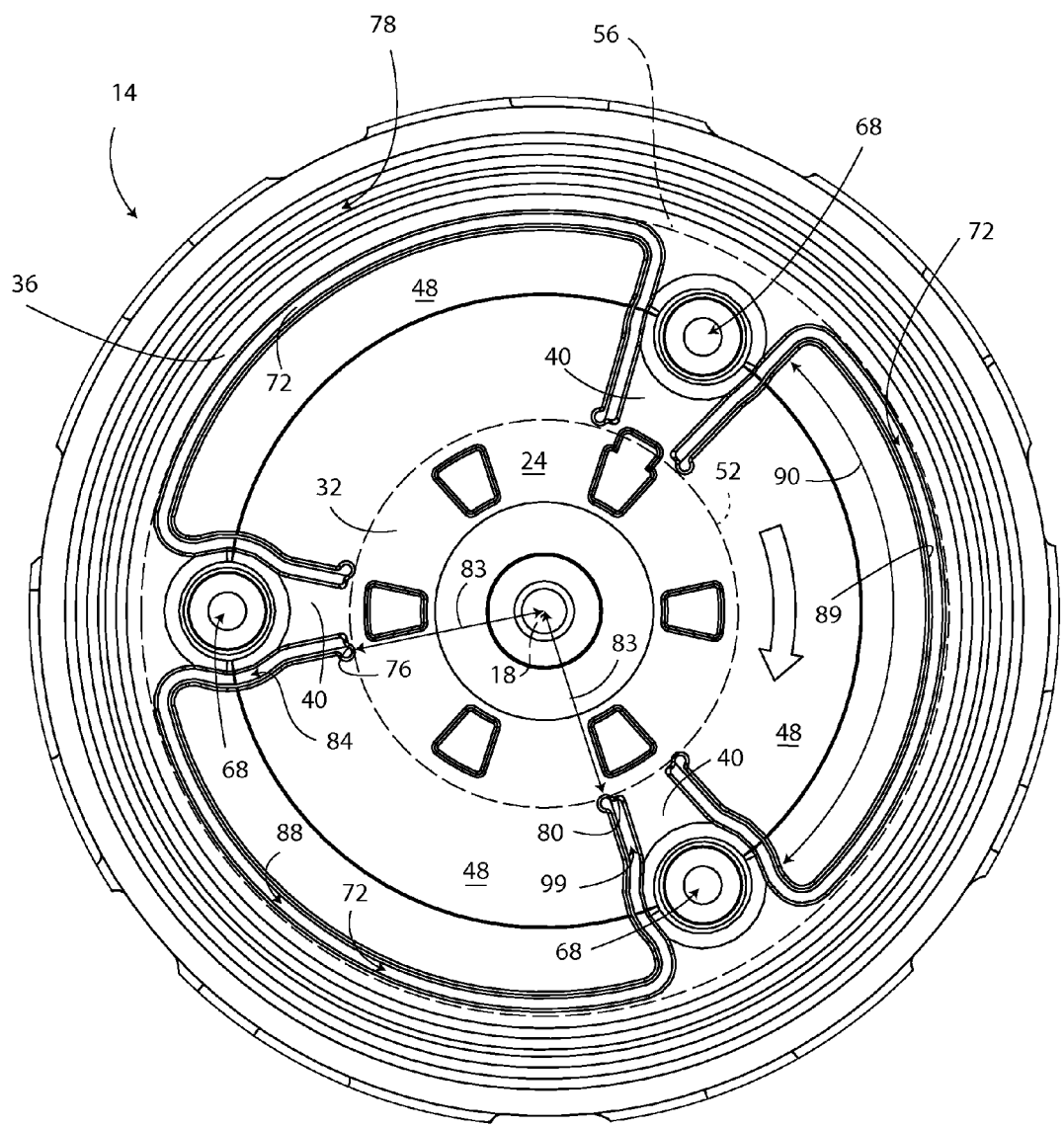
FIG. 3 is a front plan view of a hub of the axial fan of FIG. 1 shown in isolation.

As shown in FIG. 3, the face 24 includes a radially inner face portion 32 and a radially outer face portion 36. The inner face portion 32 extends radially between the axis of rotation 18 and a circular boundary line 52. The outer face portion 36 extends radially outwardly from a circular boundary line 56.

The fan 10 includes connection structures 40 and isolated members 48 positioned between the inner face portion 32 and the outer face portion 36. The fan 10 includes three of the connection structures 40, which connect the outer face portion 36 to the inner face portion 32. The connection structures 40 extend radially outwardly from the inner face portion 32 and extend radially inwardly from the outer face portion 36. Additionally, the connection structures 40 extend generally perpendicularly from the axis of rotation 18. The connection structures 40 are distributed uniformly about the axis of rotation 18, such that there is approximately 120° of separation between the connection structures.

Each of the connection structures 40 defines an aperture opening 68, which receives a fastening member (not shown) to connect the fan 10 to the rotating portion of the motor 177.

The isolated members 48 extend between adjacent connection structures 40. The isolated members 48 are directly connected to the inner face portion 32 and extend radially outwardly from the inner face portion 32. As shown in FIG. 3, the fan 10 includes three of the isolated members 48 each of which is approximately quarter-circular. Each isolated member 48 is at least partially isolated from the outer face portion 36 and the connection structures 40 by a slot 72.

When the fan 10 is connected to the electric motor 177, the isolated members 48 are isolated from the electric motor, meaning that the isolated members do not contact the electric motor and are only softly connected to the fan 10 through the connection structures 40, such that vibration from the motor does not excite the isolated members 48. The isolated members 48 are flexible and movable with respect to the outer face portion 36, the inner face portion 32, the connection structures 40, and the cylindrical portion 20 due in part to the resiliency of the thermoplastic from which the fan 100 is formed.

With continued reference to FIG. 3, the fan 10 includes three of the slots 72, which extend along the face 24 radially and circumferentially and extend completely through the face. Each of the slots 72 is partially defined by a beginning edge 76 and an ending edge 80 (See slot 72 approximately centered about the seven o'clock position in FIG. 3). The beginning edge 76 and the ending edge 80 are both a distance 83 from the axis of rotation 18.

Starting from the edge 76, the aforementioned slot 72 includes a generally radial leg 84 that extends radially outwardly from the edge 76. Next, the slot 72 includes a circumferential leg 88. Following the circumferential leg 88, the slot 72 includes another generally radial leg 99. The generally radial leg 99 terminates at the edge 80.

Figure 5:
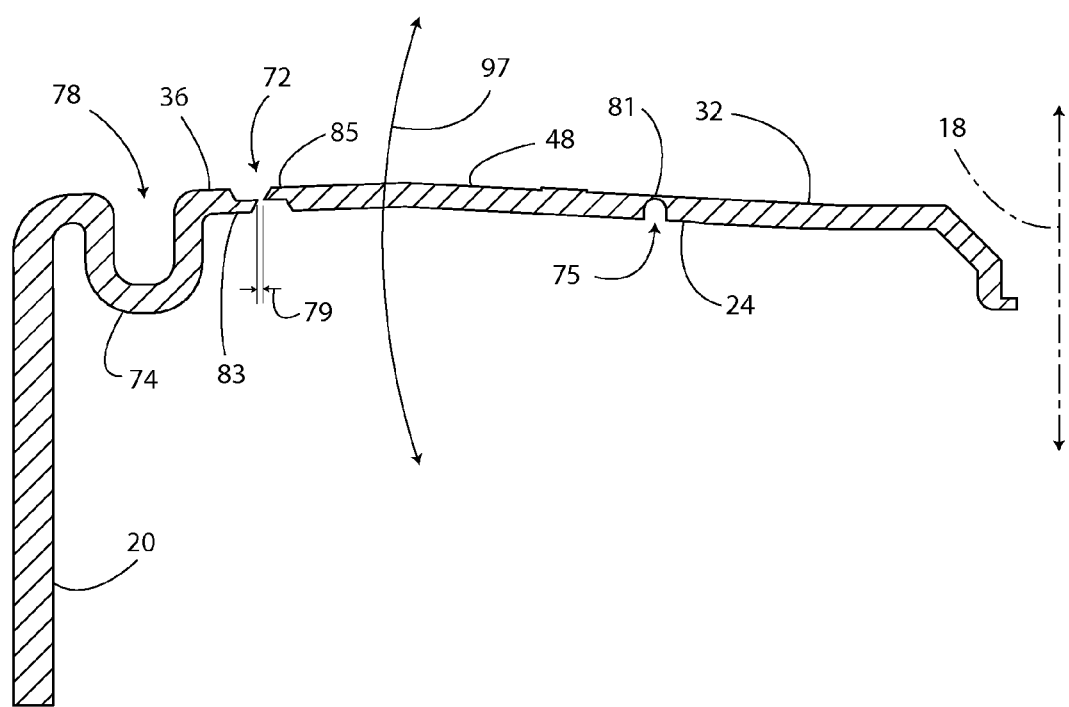
FIG. 5 is a cross sectional view of a portion of the hub of the axial fan of FIG. 1.

As shown in FIG. 5, the slots 72 are "offset slots" that allow movement between the isolated members 48 and the outer face portion 36. Since the slots 72 have a narrow width 79, the slots 72 prevent an excessive airflow through the face 24 of the hub 12. An exemplary width 79 is approximately 0.6 millimeters (0.6 mm).

FIG. 5 also shows a U-shaped groove structure 74 that circumvents the face 24 of the hub 12 and defines a groove space 78. The groove structure 74 is positioned between the face 24 and the cylindrical portion 20.

With reference again to FIGS. 4 and 5, the fan 10 includes three grooves 75 formed on the underside of the face 24 (the side nearest to the motor 177). The grooves 75 are positioned approximately in alignment with the boundary line 52. As shown in FIG. 5, the grooves 75 extend through only a portion of the thickness of the face 24, such that a membrane structure 81 remains connected to the isolated members 48 and to the inner face portion 32. The membrane structures 81 at least partially define the grooves 75.

The membrane structure 81 is a thin and flexible layer made of the same material as the rest of the fan 10. Accordingly, the grooves 75 and membrane structures 81 enable movement of the isolated members 48 relative to the inner face portion 24 about the boundary line 52 by increasing the flexibility of the face 24 at the boundary line 52. The circumferential length of the grooves 75 partially determines the vibration isolation properties of the fan 10. Also, the membrane structures 81 prevent an airflow from passing through the face 24 by way of the grooves 75. An exemplary thickness of the membrane 81 is approximately 0.25 millimeters (0.25 mm).

Figure 4:
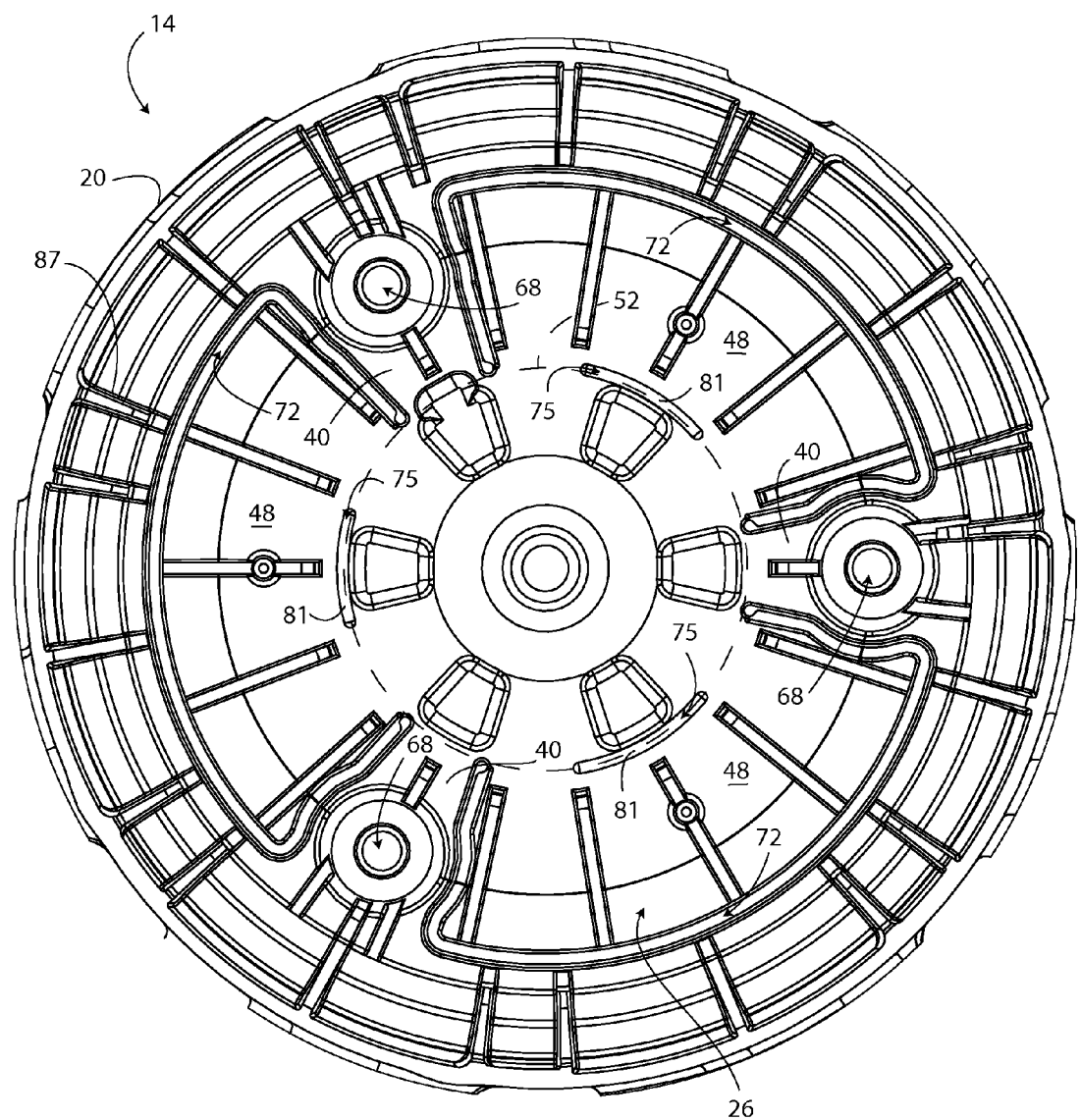
FIG. 4 is a rear plan view of the hub of the axial fan of FIG. 1 shown in isolation.

As shown in FIGS. 2 and 4, the fan 10 includes ribs 87 extending from the hub 12 and arrayed about the axis of rotation 18. The ribs 87 extend axially rearward from the face 24 and extend radially inwardly from the cylindrical portion 20. The ribs 87 are distributed about the hub 12 to structurally reinforce the face 24 and the cylindrical portion 20. Additionally, the ribs 87 can generate a cooling airflow through or around the motor 177.

Figure 6:
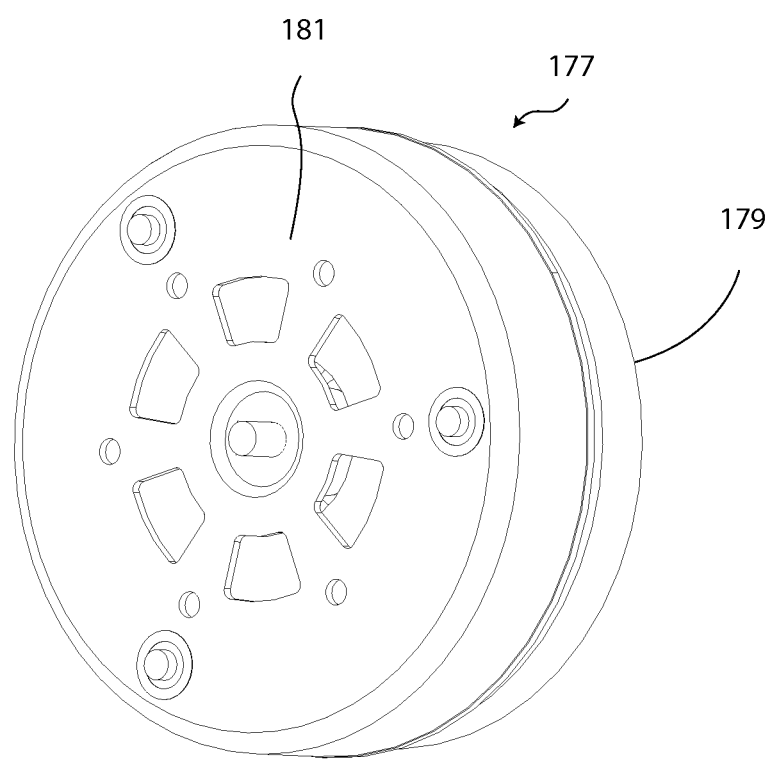
FIG. 6 is a simplified front perspective view of an electrically commutated motor to which the axial fan of FIG. 1 is connectable.

The hub 12 of the fan 10 is connectable to various types of electric motors including the electric motor 177 shown in FIG. 6. The electric motor 177 is an electronically commutated motor, which is sometimes referred to as an ECM or an EC motor. The motor 177 includes a stationary component, the stator 179, and a rotating component, the rotor 181, which operate in a way known to those of ordinary skill in the art.

EC motors, such as the motor 177, are known to resonate at certain angular velocities of the rotor 181. For example, EC motors can exhibit a type of resonance referred to as an ovalization resonance, among other modes of resonance. The ovalization resonances can excite resonances in the fan 10, which cause the fan to also emit noise.

In operation, at least a portion of the fan 10 is decoupled or isolated from the resonant modes and the excitation forces of the electric motor 177 to reduce the sound radiation efficiency of the fan. The movement of the isolated members 48 dissipates the energy transferred to the fan 10 in a way that reduces the ability of the fan 10 to produce a bothersome or objectionable amount of noise. In particular, the fan 10 is configured to offer axial isolation of the inner face portion 32 from the outer face portion 36 (that is driven by the motor 177).

The movement of the isolated members 48 includes a pivoting movement (see path 97, FIG. 5) about the boundary line 52 (FIG. 3). Accordingly, during the dampening and attenuating of the excitation forces, the isolated members 48 move in a direction that has a component in the axial direction and a component in the radial direction. Furthermore, since each isolated member 48 is isolated from each other isolated member, each isolated member can move independently of each other isolated member.

Figure 7:
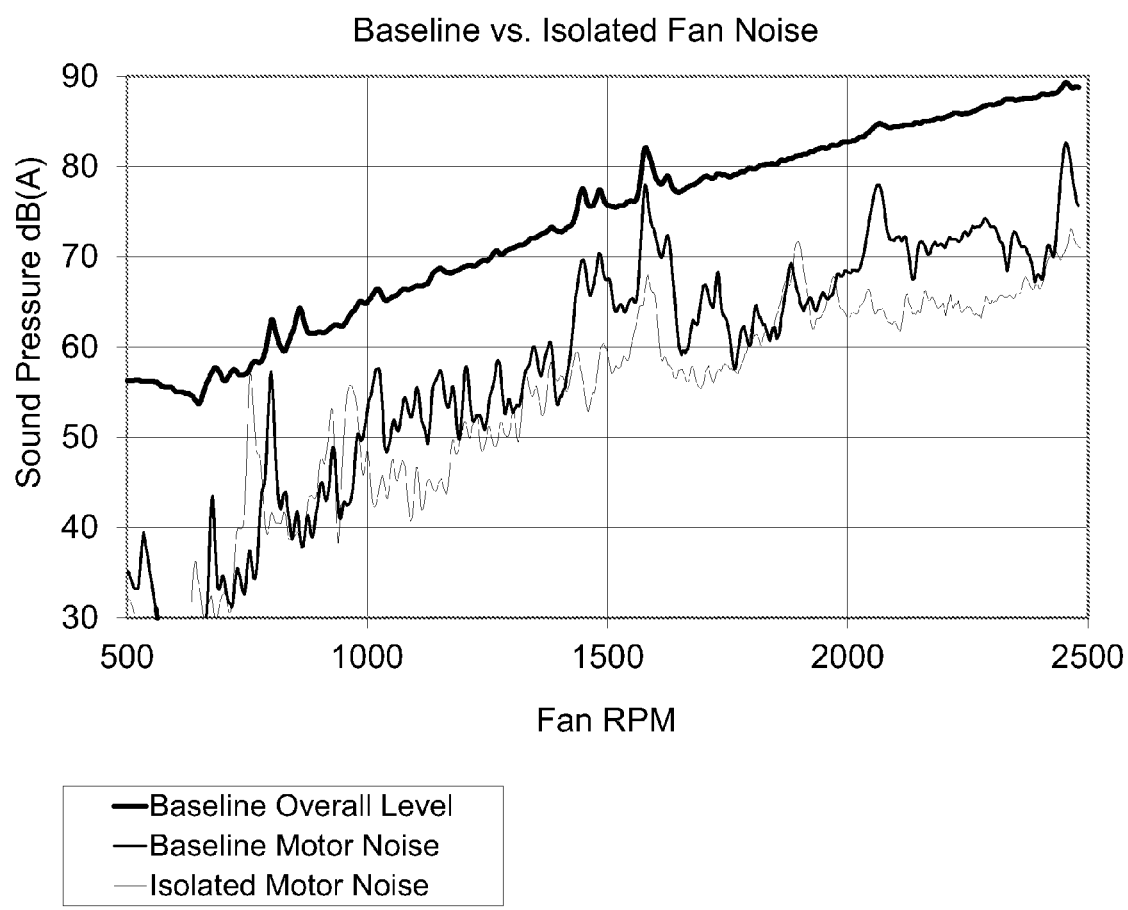
FIG. 7 is a graph of sound pressure verses RPM for the axial fan of FIG. 1.

As shown in the graph of FIG. 7, sound pressure level of the fan 10 is plotted versus rotations per minute of the fan. The graph shows that the fan 10 (as represented by the line labeled "Isolated Motor Noise") has a reduced sound pressure level as compared to a fan without the isolated members 48 and the slots 72 (as represented by the line labeled "Baseline Motor Noise"). The fan without the isolated members 48 and the slots 72 is not shown and is referred to herein as a baseline fan. In FIG. 7, the sound pressure level of the fan 10 and the baseline fan is plotted for RPMs ranging from 500 to 2500. The baseline fan emits the most bothersome amount of sound pressure due to the motor (approximately 83 dB) at approximately 1700 RPM. To make the fan 10 have the greatest effect on reducing the sound pressure level, the isolated members 48, connection structures 40, and slots 72 have been sized and shaped, to dampen and attenuate the excitation forces that produce sound in this RPM region. As shown in FIG. 7, the fan 10 achieves an approximately 10 dB reduction in sound pressure level at approximately 1600 RPM as well as a significant reduction in sound pressure level for most RPM above 1600 RPM.

The fan 10 is "tunable" to dampen and attenuation a particular mode of resonance generated by the motor 177. In particular, the size and shape of the isolated members 48 and the slots 72 determines which of the resonant modes and excitation forces the fan 10 dampens and attenuates most efficiently. For example, as shown in FIG. 3, the isolated member 48 that is centered approximately at the three o'clock position has a radially outer edge 89 having an arc length 90. Lengthening or shortening the arc length 90 (by fabricating another fan 10) tunes the fan 10 to dampen and attenuate a particular resonant mode(s). Similarly, the fan 10 may be tuned by moving the position of the connection structures 40 relative to the isolated members 48. Also, the fan 10 may be tuned by making the edge 89 a variable distance from the axis of rotation 18.

Other embodiments of the fan 10 having differently shaped connection structures 40, isolated members 48 and slots 72 are described below. Each of the other embodiments of the fan 10 generates a reduction in noise for a particular frequency or range of frequencies as compared to the baseline fan.

Figure 8:
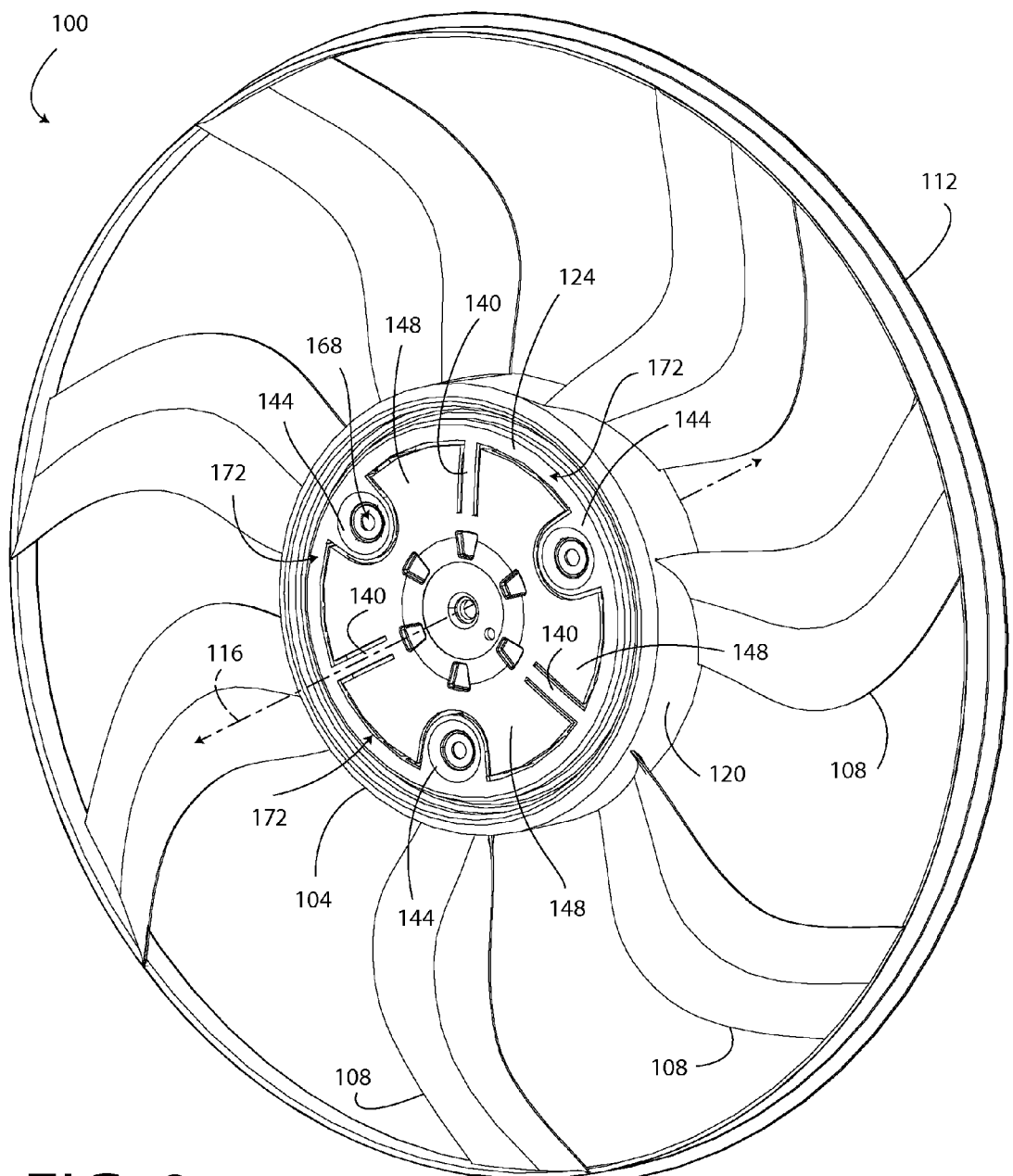
FIG. 8 is a front perspective view of another embodiment of an axial fan.
Figure 9:
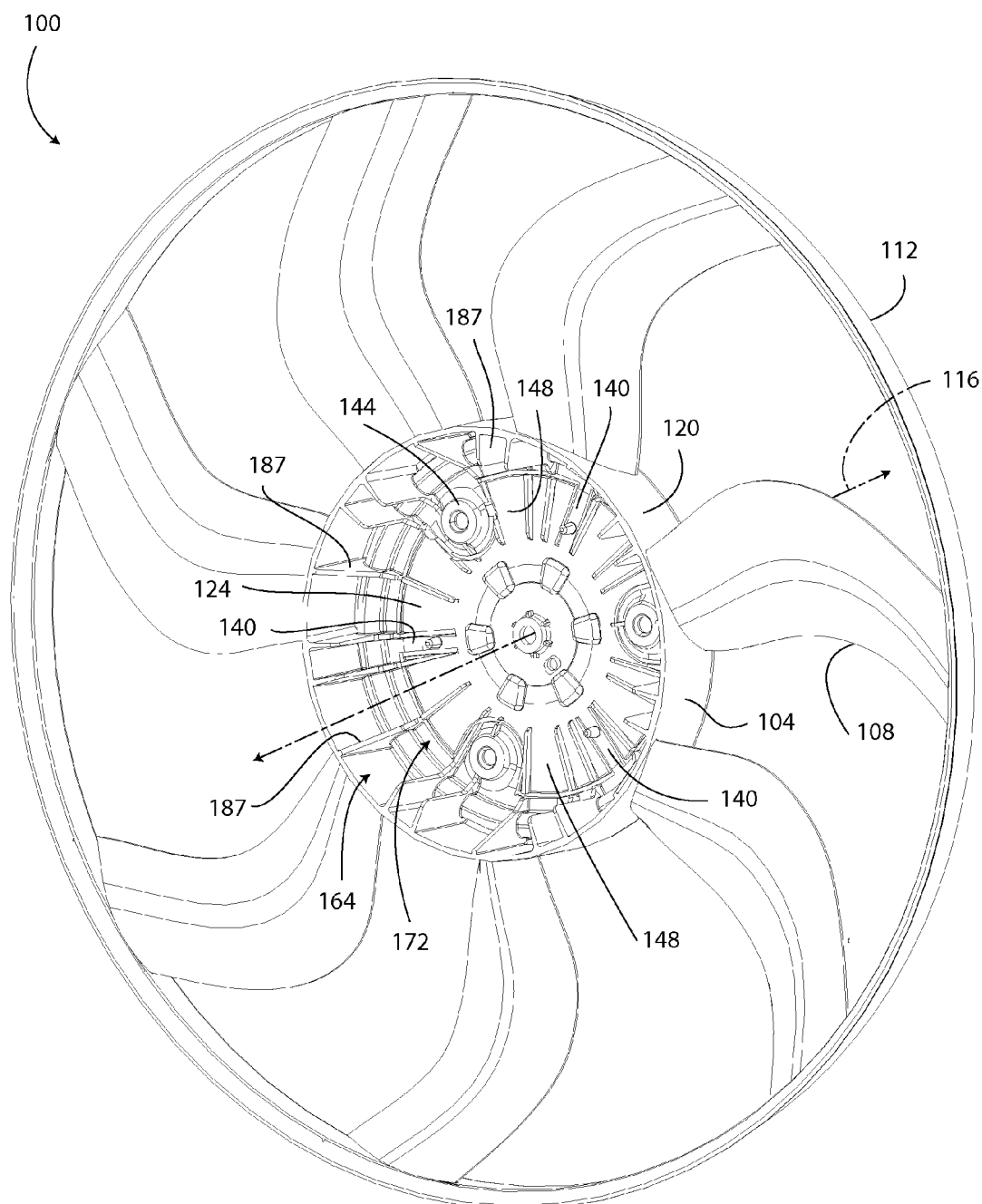
FIG. 9 is a rear perspective view of the axial fan of FIG. 8.
Figure 10:
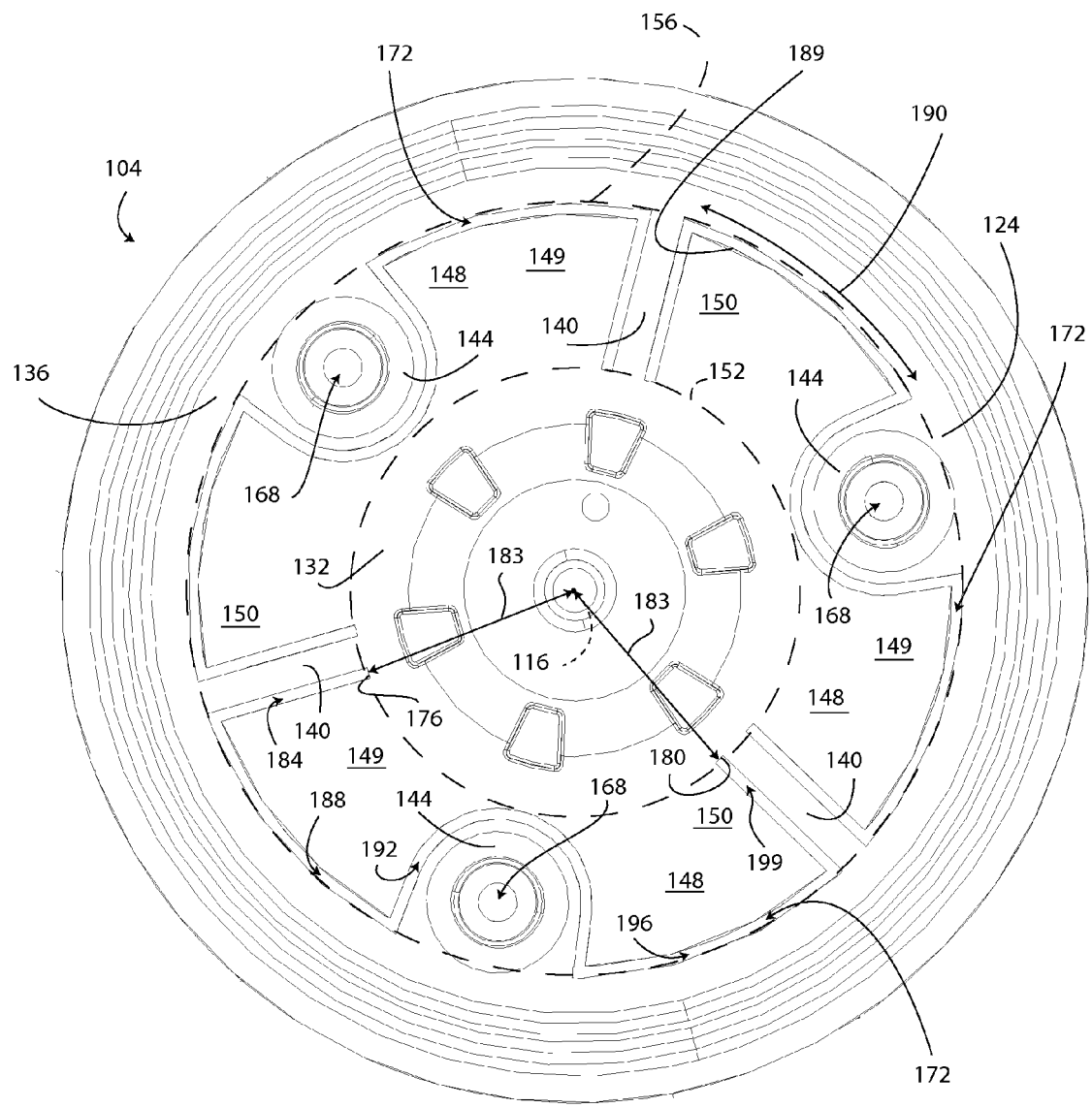
FIG. 10 is a front plan view of a hub of the axial fan of FIG. 8 shown in isolation.

As shown in FIGS. 8-10, an axial fan assembly 100 includes a hub 104, blades 108 extending radially outwardly from the hub, and a band 112 connected to the tips of each of the blades. Rotation of the fan 100 causes the blades 108 to generate an airflow, which is coaxial with an axis of rotation 116 of the fan. In one typical application, the fan 100 is positioned so that the airflow is directed through a heat exchanger of a liquid cooled engine (not shown). The fan 100 includes features that reduce the noise that is emitted by the rotating fan.

With reference to FIG. 8, the hub 104 includes a cylindrical portion 120 that extends axially from a radially extending face 124. The cylindrical portion 120 extends axially rearward from the face 124, in a direction parallel to the axis of rotation 116, about which the hub is rotatable. The hub 104 defines a hub cavity 164 (FIG. 9) in which at least a portion of an electric motor 177 is positioned. The hub 104 and each other portion of the fan 100 are typically formed from injection molded thermoplastic.

As shown in FIG. 10, the face 124 includes a radially inward face portion 132 and a radially outward face portion 136. The inward face portion 132 extends radially between the axis of rotation 116 and a boundary line 152. The outward face portion 136 extends radially outwardly from a boundary line 156.

The fan 100 includes connection structures 140, connection tabs 144, and isolated members 148 positioned between the inward face portion 132 and the outward face portion 136. The fan 100 includes three of the connection structures 140, which connect the outward face portion 136 to the inward face portion 132. The connection structures 140 extend radially outwardly from the inward face portion 132 and extend radially inwardly from the outward face portion 136. Additionally, the connection structures 140 extend generally perpendicularly from the axis of rotation 116. The connection structures 140 are approximately uniform in width as measured circumferentially with respect to the face 124 and are approximately uniform in length as measured radially with respect to the face. The connection structures 140 are distributed uniformly about the axis of rotation 116, such that there is approximately 120° of separation between the connection structures.

The three connection tabs 144 of the fan 100 are directly connected to the outward face portion 136 and extend radially inwardly from the outward face portion. The connection tabs 144 extend generally perpendicularly to the axis of rotation 116 and are approximately uniform in length as measured radially with respect to the face 124. The connection tabs 144 are distributed uniformly about the axis of rotation 116, such that there is approximately 120° of separation between the connection tabs. Each connection tabs 144 defines an aperture opening 168, which receives a fastening member (not shown) to connect the fan 100 to the motor 177.

The isolated members 148 extend between adjacent connection structures 140 and are directly connected to the inward face portion 132 and extend radially outwardly from the inward face portion 132. As shown in FIG. 10, the fan 100 includes three of the isolated members 148 each of which is approximately U-shaped and includes a portion 149 and a portion 150. Each isolated member 148 is isolated from the outward face portion 136, the connection structures 140, and the connection tabs 144 by a slot 172.

When the fan 100 is connected to the electric motor 177, the isolated members 148 are also isolated from the electric motor, meaning that the isolated members do not contact the electric motor and are only softy connected to the fan 100 through connection structures 140 such that vibration due to the motor does not excite the isolated members 148. The isolated members 148 are flexible and movable with respect to the outward face portion 136, the inward face portion 132, the connection structures 140, the connection tabs 144, and the cylindrical portion 120 due in part to the resiliency of the thermoplastic from which the fan 100 is formed.

With continued reference to FIG. 10, the fan 100 includes three of the slots 172, which extend along the face 124 radially and circumferentially and extend at least partially through the face. Each of the slots 172 is partially defined by a radially inward most edge 176 and a radially inward most edge 180 (See slot 172 approximately centered about the seven o'clock position in FIG. 10). The edge 176 is a distance 183 from the axis of rotation 116 and the edge is 180 is the distance 183 from the axis of rotation 116.

Starting from the edge 176, the aforementioned slot 172 includes a radial leg 184 that extends radially outwardly from the beginning edge. Next, the slot 172 includes a circumferential leg 188, which is connected to a U-shaped leg 192. The slot 172 also includes another circumferential leg 196 and another radial leg 199. The radial leg 199 terminates at the edge 180.

As shown in FIG. 9, the fan 100 includes ribs 187 extending from the hub 104 and arrayed about the axis of rotation 116. The ribs 187 extend axially rearward from the face 124 and extend radially inwardly from the cylindrical portion 120. The ribs 187 are distributed about the hub 104 to structurally reinforce the face 124 and the cylindrical portion 120. Additionally, the ribs 187 can generate a cooling airflow through or around the motor 177.

The fan 100 is "tunable" to dampen and attenuate a particular mode of resonance generated by the motor 177. In particular, the size and shape of the connection structures 140, the isolated members 148, and the slots 172 determines which of the resonant modes and excitation forces that the fan 100 dampens and attenuates most efficiently. For example, as shown in FIG. 10, the portion 150 (centered approximately at the one o'clock position) has an outer edge 189 having an arc length 190. Lengthening or shorting the arc length 190 (by fabricating another fan 100) tunes the fan 100 to dampen and attenuate a particular resonant mode(s). Similarly, the fan 100 may be tuned by changing the width of the slots 172 and by moving the position of the connection tabs 144 and the connection structures 140 relative to the isolated members 148.

Figure 11:
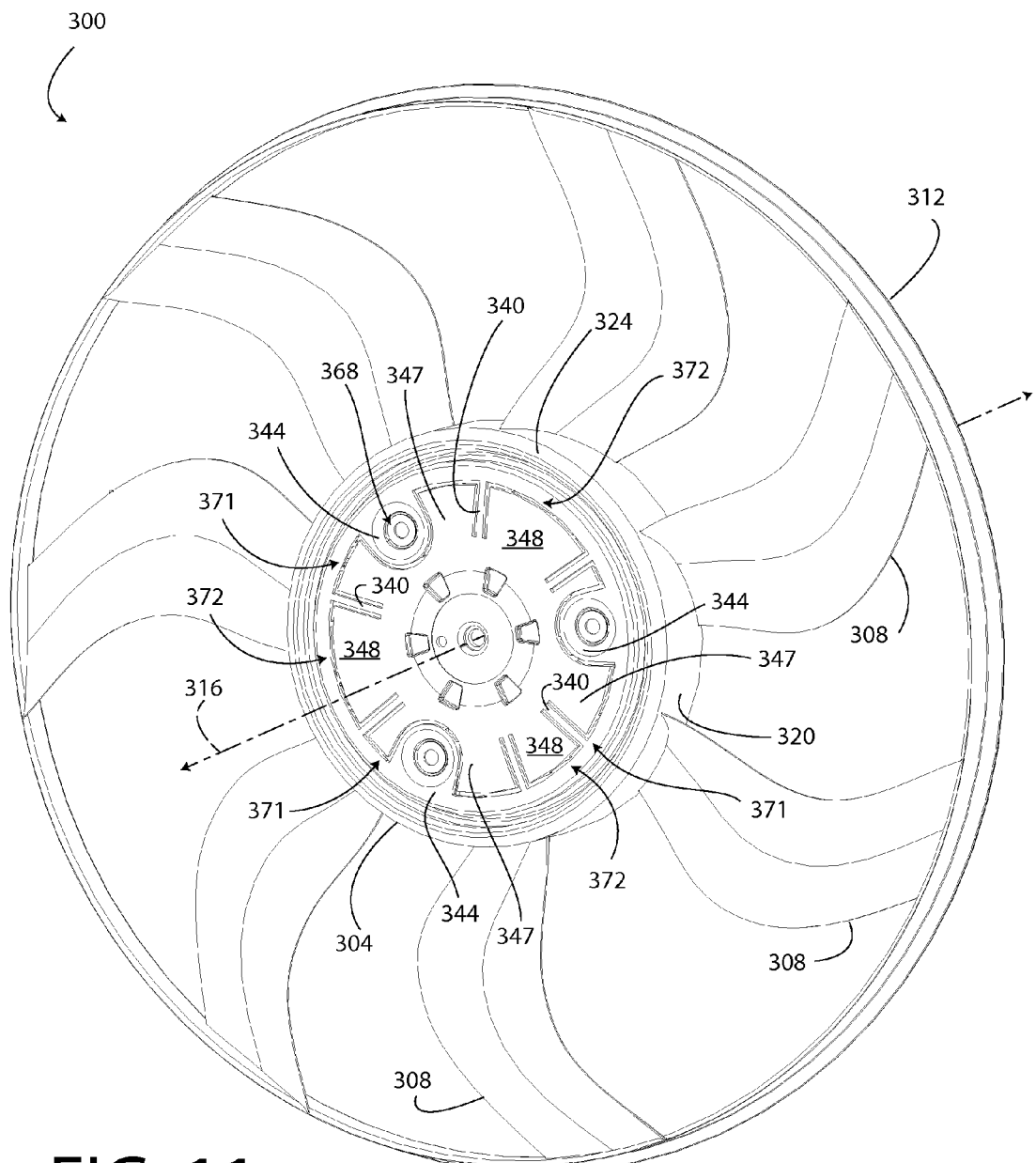
FIG. 11 is a front perspective view of yet another embodiment of an axial fan.
Figure 12:
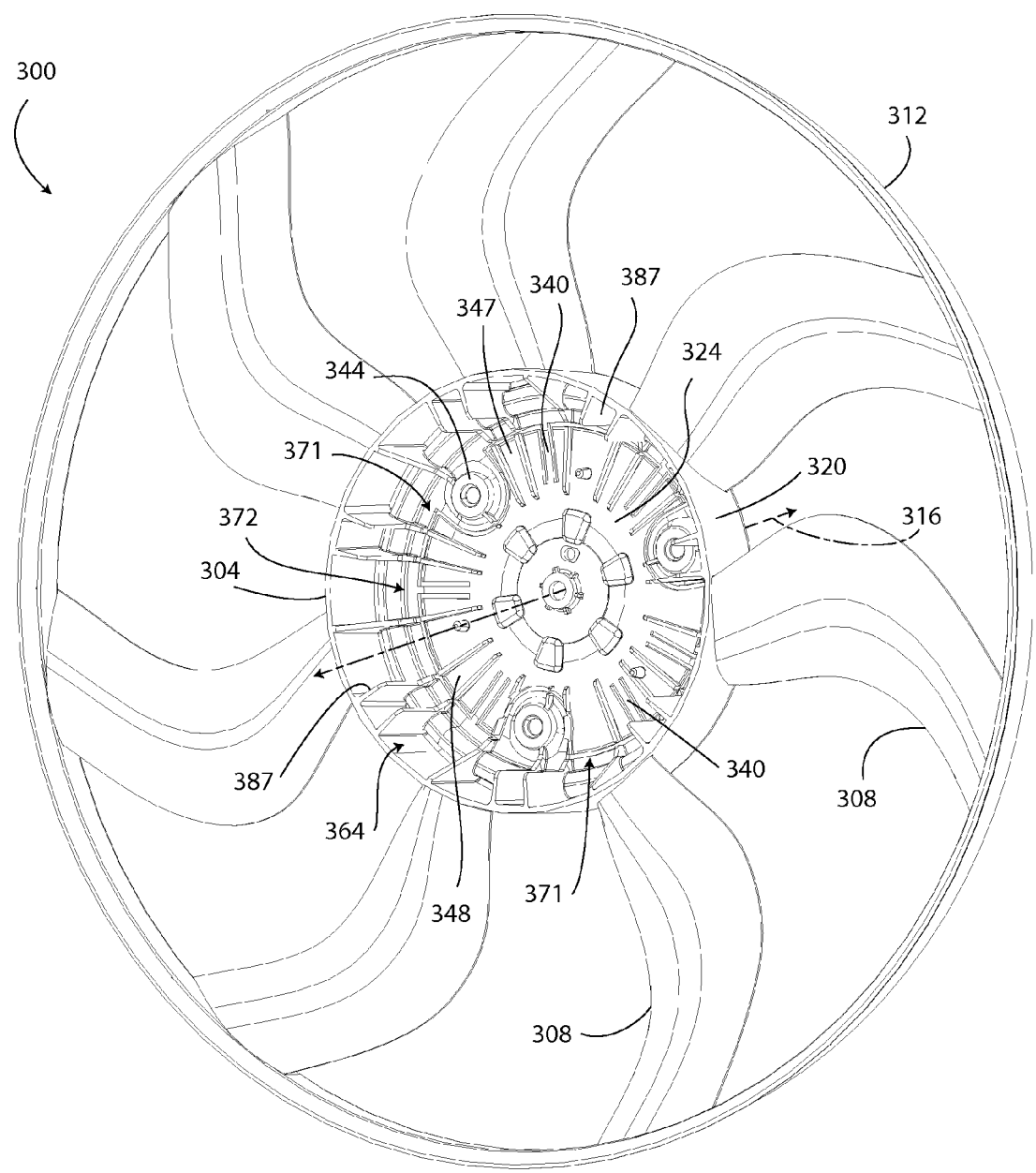
FIG. 12 is a rear perspective view of the axial fan of FIG. 11.
Figure 13:
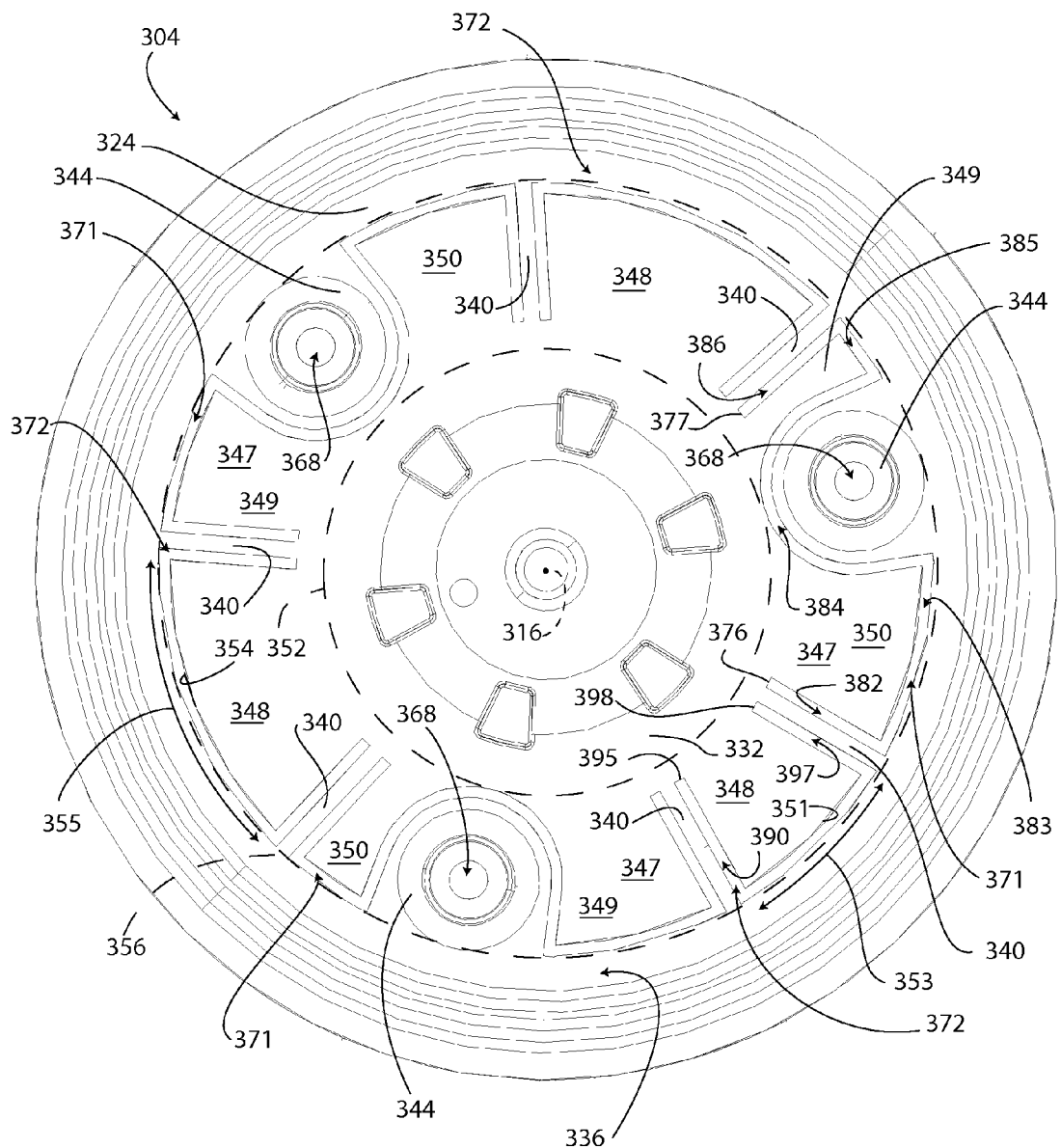
FIG. 13 is a front plan view of a hub of the axial fan of FIG. 11 shown in isolation.

As shown in FIGS. 11-13, another axial flow fan 300 includes a hub 304, blades 308 extending radially outwardly from the hub, and a band 312 connected to the tips of each of the blades. Rotation of the fan 300 causes the blades 308 to generate an airflow, which is generally coaxial with an axis of rotation 316 of the fan.

With reference to FIG. 11, the hub 304 includes a cylindrical portion 320 extending from to a face 324. The cylindrical portion 320 extends axially rearward from the face 324, in a direction parallel to the axis of rotation 316. The hub 304 defines a hub cavity 364 (FIG. 12) in which at least a portion of the electric motor 177 is positioned. The hub 304 and each other portion of the fan 300 are formed from injection molded thermoplastic.

With reference to FIG. 13, the face 324 includes a radially inward face portion 332 and a radially outward face portion 336. The inward face portion 332 extends radially between the axis of rotation 316 and a boundary line 352. The outward face portion 336 extends radially outwardly from a boundary line 356.

The fan 300 includes connection structures 340, aperture structures 344, isolated members 347, and isolated members 348 positioned between the inward face portion 332 and the outward face portion 336. The fan 300 includes six of the connection structures 340, which connect the outward face portion 336 to the inward face portion 332. The connection structures 340 extend radially outwardly from the inward face portion 332 and extend radially inwardly from the outward face portion 336. The connection structures 340 extend generally perpendicularly from the axis of rotation 316. The connection structures 340 are approximately uniform in width as measured circumferentially with respect to the face 324 and are approximately uniform in length as measured radially with respect to the face. The connection structures 340 are distributed about the axis of rotation 316.

The fan 300 includes three of the aperture structures 344 directly connected to the outward face portion 336 and extending radially inwardly. Additionally, the aperture structures 344 extend generally perpendicularly to the axis of rotation 316. The aperture structures 344 are approximately uniform in shape and are approximately uniform in length as measured radially with respect to the face 324. The aperture structures 344 are distributed uniformly about the axis of rotation 316, such that there is approximately 120° of separation between the aperture structures. Each aperture structure 344 defines an aperture opening 368, which receives a fastening member (not shown) to connect the fan 300 to the motor 177.

The isolated members 347 are directly connected to the inward face portion 332 and extend radially outwardly from the axis of rotation 316. As shown in FIG. 13, the fan 300 includes three of the isolated members 347. The isolated members 347 are approximately U-shaped and include a portion 349 and a portion 350 of different circumferential widths. The isolated members 347 are isolated from the outward face portion 336, the connection structures 340, and the aperture structures 344 by a slot 371.

The isolated members 348 are directly connected to the inward face portion 332 and extend radially outwardly from the axis of rotation 316. The fan 300 includes three of the isolated members 348. The isolated members 348 are approximately clamshell-shaped and are isolated from the outward face portion 336, the connection structures 340, and the aperture structures 344 by a slot 372. As shown in FIG. 13, the isolated member 348 nearest to the four o'clock position has a circumferential width that is less than the other two isolated members 348. Specifically, the isolated member 348 nearest to the four o'clock position has a radially outer edge 351 with an arc length 353, and the isolated member 348 nearest to the eight o'clock position has a radially outer edge 354 with an arc length 355. The arc length 355 is greater than the arc length 353.

When the fan 300 is connected to the electric motor 177, the isolated members 347, 348 are also isolated from the electric motor, meaning that the isolated members do not contact the electric motor. The isolated members 347, 348 are 432 flexible and movable with respect to the outward face portion 336, the inward face portion 332, the connection structures 340, the aperture structures 344, and the cylindrical portion 320 due in part to the resiliency of the thermoplastic from which the fan 300 is formed.

With reference to FIG. 13, the fan 300 includes three of the slots 371, which extend along the face 324 radially and circumferentially and extend completely through the face. Each of the slots 371 is partially defined by an inward most edge 376 and an inward most edge 377 (See slot 371 approximately centered about the three o'clock position in FIG. 13). The aforementioned slot 371 includes a radial leg 382 that extends radially outwardly from the beginning edge 376. Next, the slot 371 includes a circumferential leg 383, which is connected to a U-shaped leg 384. The slot 371 also includes another circumferential leg 385 and another radial leg 386, which terminates at the edge 377.

The fan 300 also includes three of the slots 372 which extend along the face 324 radially and circumferentially and extend completely through the face. The slot 372 nearest the four o'clock position, as shown in FIG. 13, includes a radial leg 390 that extends radially outwardly from an inward most edge 395. Next, the slot 372 includes a circumferential leg 396, which is followed by another radial leg 397. The radial leg 397 terminates at an inward most edge 398.

As shown in FIG. 12, the fan 300 includes ribs 387 extending from the hub 304 and arrayed about the axis of rotation 316. The ribs 387 extend axially rearward from the face 324 and extend radially inwardly from the cylindrical portion 320. The ribs 387 are distributed about the hub 304 to structurally reinforce the face 324 and the cylindrical portion 320. Additionally, the ribs 387 generate a cooling airflow through or around the motor 177.

Figure 14:
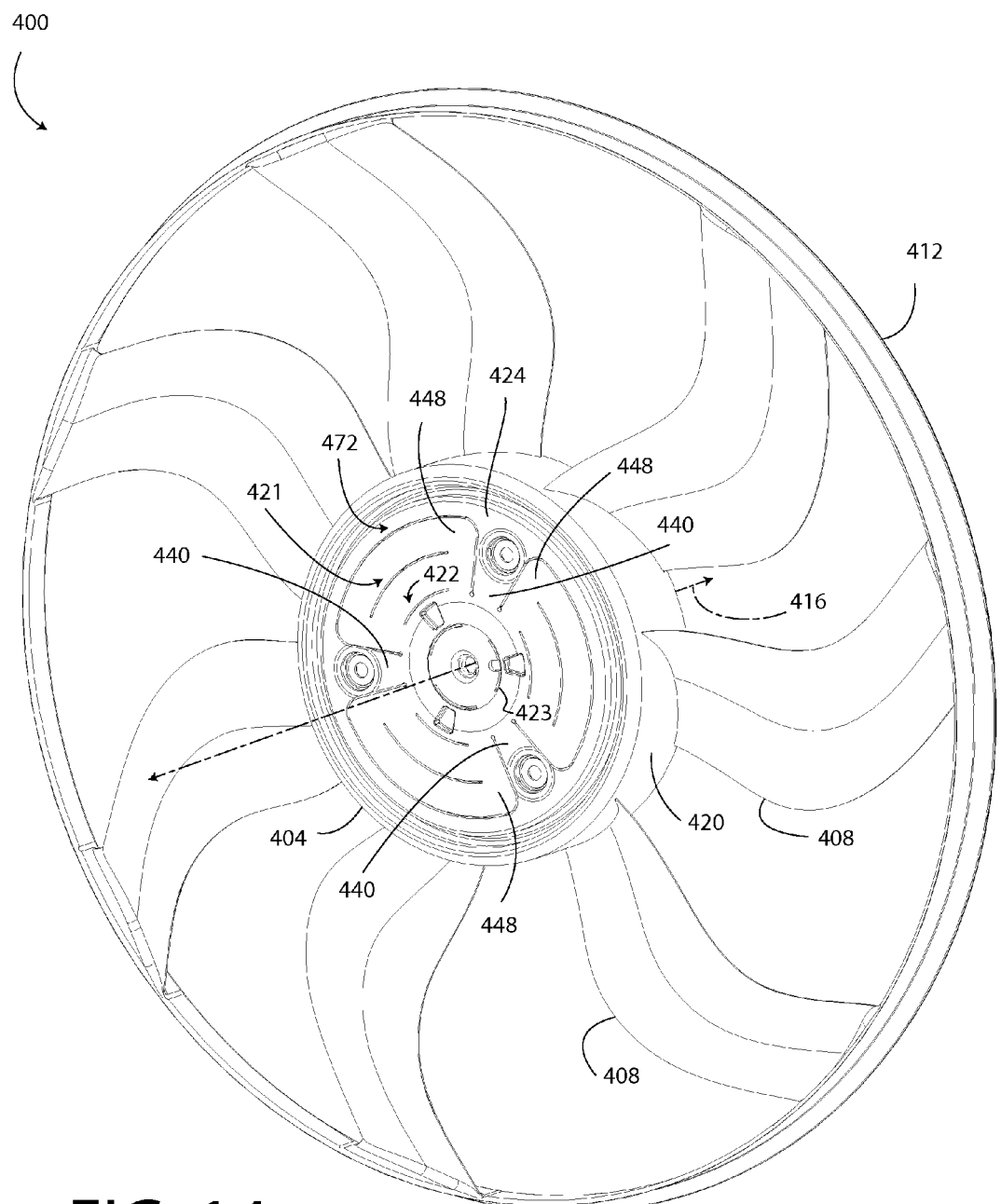
FIG. 14 is a front perspective view of still another embodiment of an axial fan.
Figure 15:
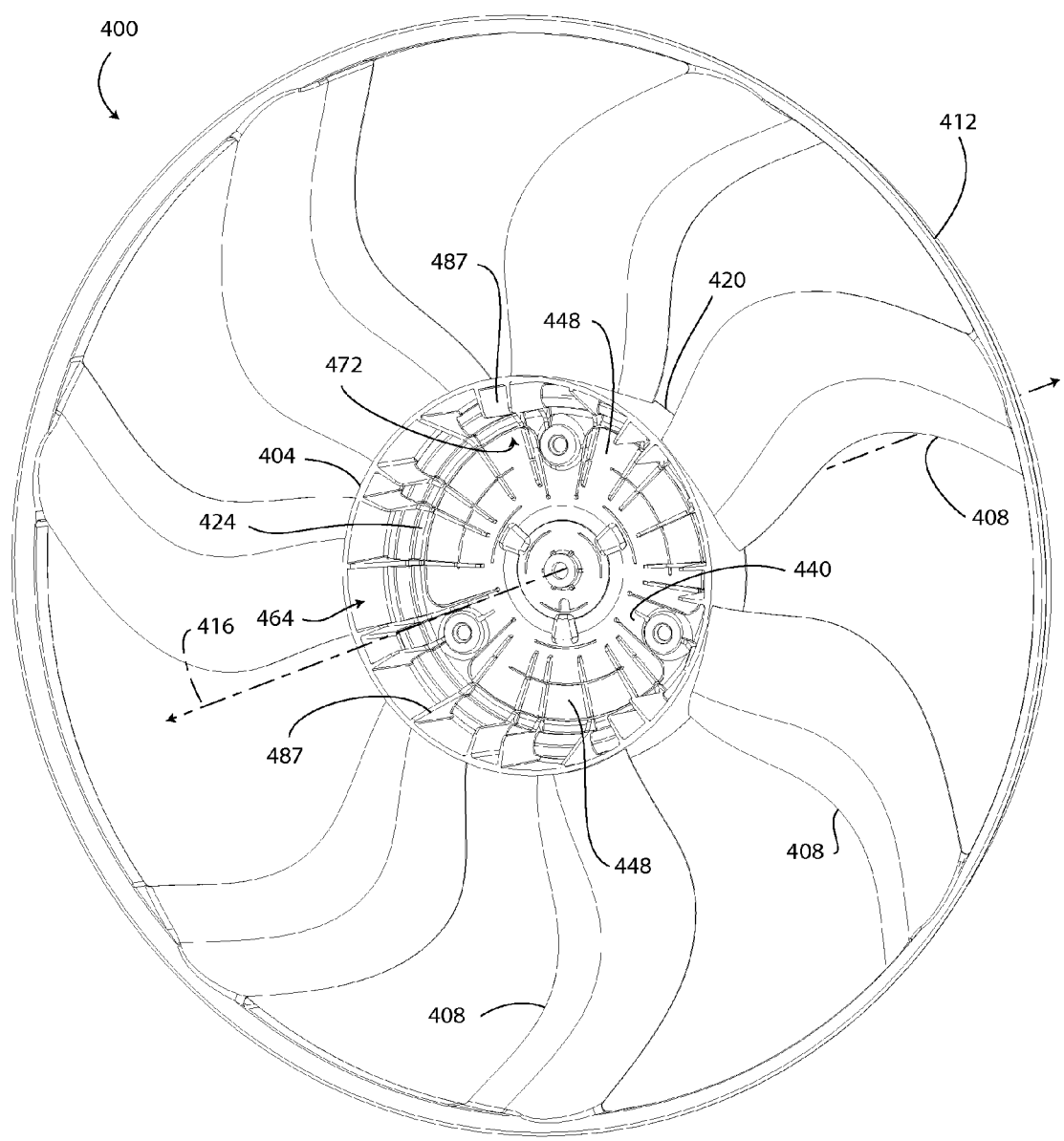
FIG. 15 is a rear perspective view of the axial fan of FIG. 14.
Figure 16:
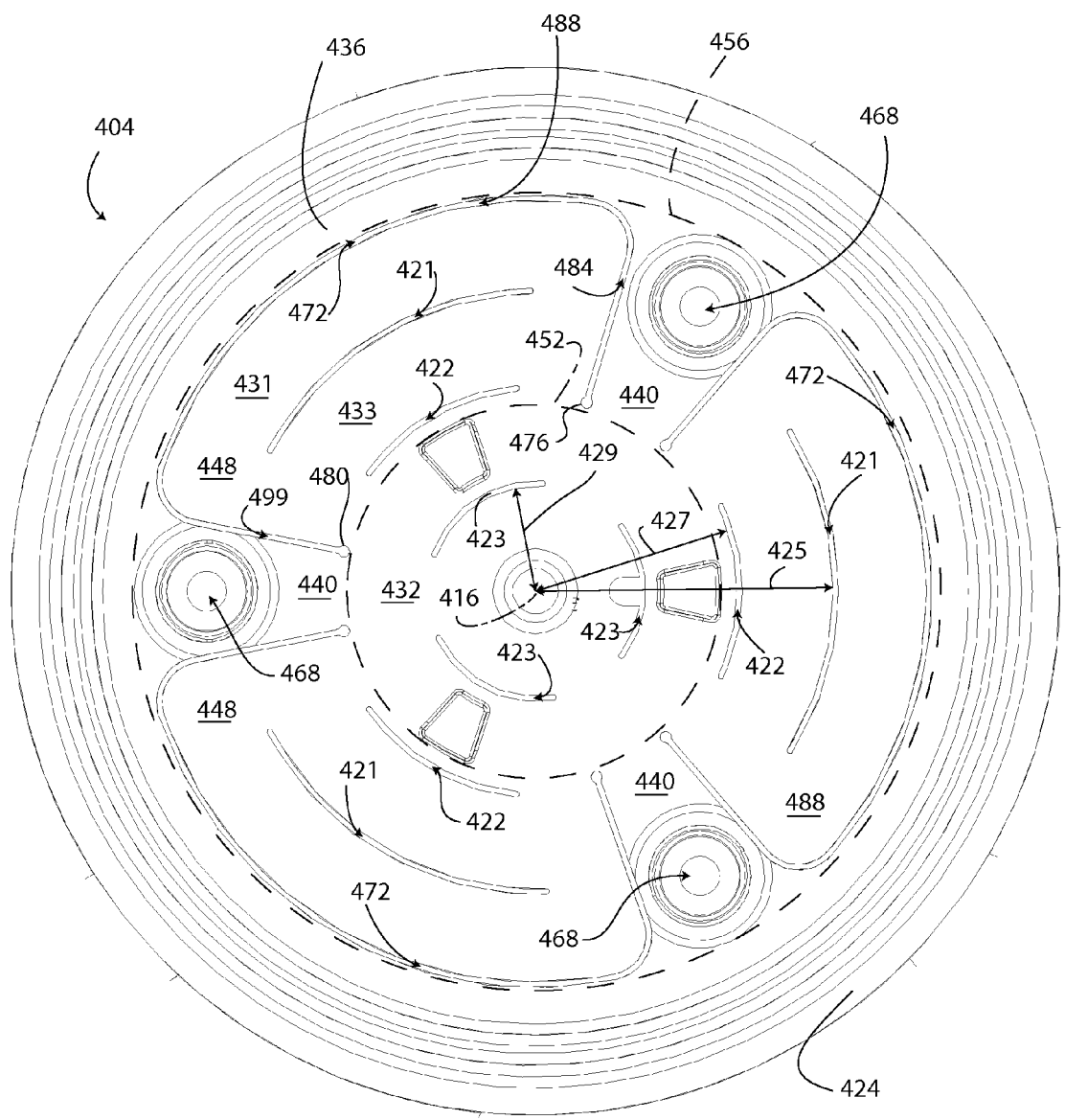
FIG. 16 is a front plan view of a hub of the axial fan of FIG. 14 shown in isolation.

As shown in FIGS. 14-16, another axial flow fan 400 includes a hub 404, blades 408 extending radially outwardly from the hub, and a band 412 connected to the tips of each of the blades. Rotation of the fan 400 causes the blades 408 to generate an airflow, which is generally coaxial with an axis of rotation 416 of the fan.

The hub 404 includes a cylindrical portion 420 connected to a face 424. The cylindrical portion 420 extends axially rearward from the face 424, in a direction parallel to the axis of rotation 416. The hub 404 defines a hub cavity 464 (FIG. 15) in which at least a portion of the electric motor 177 is positioned. The hub 404 and each other portion of the fan 400 are formed from injection molded thermoplastic.

With reference to FIG. 16, the face 424 includes a radially inward face portion 432 and a radially outward face portion 436. The inward face portion 432 extends radially between the axis of rotation 416 and a boundary line 452. The outward face portion 436 extends radially outwardly from a boundary line 456.

The fan 400 includes connection structures 440 and isolated members 448 positioned between the inward face portion 432 and the outward face portion 436. The fan 400 includes three of the connection structures 440, which connect the outward face portion 436 to the inward face portion 432. The connection structures 440 extend radially outwardly from the inward face portion 432 and extend radially inwardly from the outward face portion 436. Additionally, the connection structures 440 extend generally perpendicularly from the axis of rotation 416. The connection structures 440 are distributed uniformly about the axis of rotation 416, such that there is approximately 120° of separation between the connection structures. The connection structures 440 each define an aperture opening 468 to receive a fastening member, which connects the fan 400 to the electric motor 177. Each aperture opening 468 extends through its corresponding connection structure 440.

The isolated members 448 are directly connected to the inward face portion 432 and extend radially outwardly from the axis of rotation 416. As shown in FIG. 16, the fan 400 includes three of the isolated members 448. The isolated members 448 are approximately fan-shaped. Each isolated member 448 is isolated from the outward face portion 436 and the connection structures 440 by a slot 472.

When the fan 400 is connected to the electric motor 177, the isolated members 448 are also isolated from the electric motor, meaning that the isolated members do not contact the electric motor. The isolated members 448 are flexible and movable with respect to the outward face portion 436, the inward face portion 432, the connection structures 440, and the cylindrical portion 420 due in part to the resiliency of the thermoplastic from which the fan 400 is formed.

As shown in FIG. 16, the fan 400 includes three of the slots 472, which extend along the face 424 radially and circumferentially and extend completely through the face. Each of the slots 472 is partially defined by a circular portion 476 and a circular portion 480 (See slot 472 approximately centered about the eleven o'clock position in FIG. 16). The aforementioned slot 472 includes a radial leg 484 that extends radially outwardly from the portion 476. Next, the radial leg 484 includes a circumferential leg 488. The slot 472 is then followed by another radial leg 499, which terminates at the portion 480.

The fan 400 also includes three other sets of slots including the slots 421, the slots 422, and the slots 423. The fan 400 includes three of the slots 421, which are positioned radially inwardly of the circumferential legs 488 of the slots 472. The slots 421 are positioned a predetermined distance 425 from the axis of rotation 416 and partially separate a radially outward portion 431 of the isolate members 448 from a radially inward portion 433 of the isolated members.

The fan 400 includes three of the slots 422, which are positioned between the slots 421 and the radially inward face portion 432. The slots 422 partially separate the isolated members 448 from the inward face portion 432. The slots 422 are positioned a predetermined distance 427 from the axis of rotation 416. The length of the slots 422 contributes to the overall dynamic response of the fan 400 since lengthening the slots 422 makes it easier to move the isolated members 448 relative to the inward face portion 432 and shortening the slots 422 makes it harder to move the isolated members relative to the inward face portion.

The fan 400 includes three of the slots 423. The slots 423 are positioned radially inwardly of the slots 422 on the inward face portion 432. The slots 423 are positioned a predetermined distance 429 from the axis of rotation 416.

As shown in FIG. 15, the fan 400 includes ribs 487 extending from the hub 404 and arrayed about the axis of rotation 416. Specifically, the ribs 487 extend axially rearward from the face 424 and extend radially inwardly from the cylindrical portion 420. The ribs 487 are distributed about the hub 404 to structurally reinforce the face 424 and the cylindrical portion 420. Additionally, the ribs 487 generate a cooling airflow through or around the motor 177.

Figure 17:
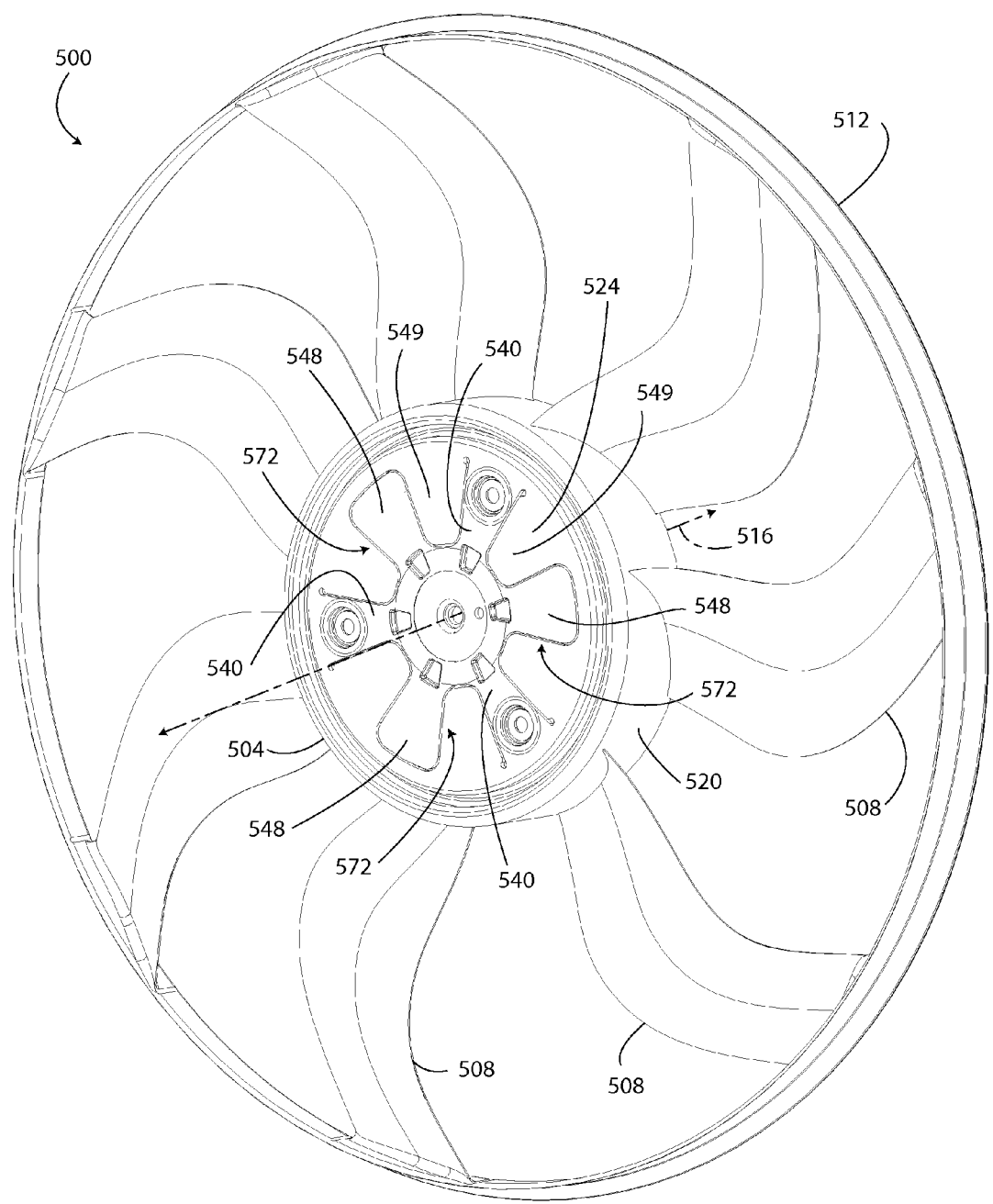
FIG. 17 is a front perspective view of still another embodiment of an axial fan.
Figure 18:
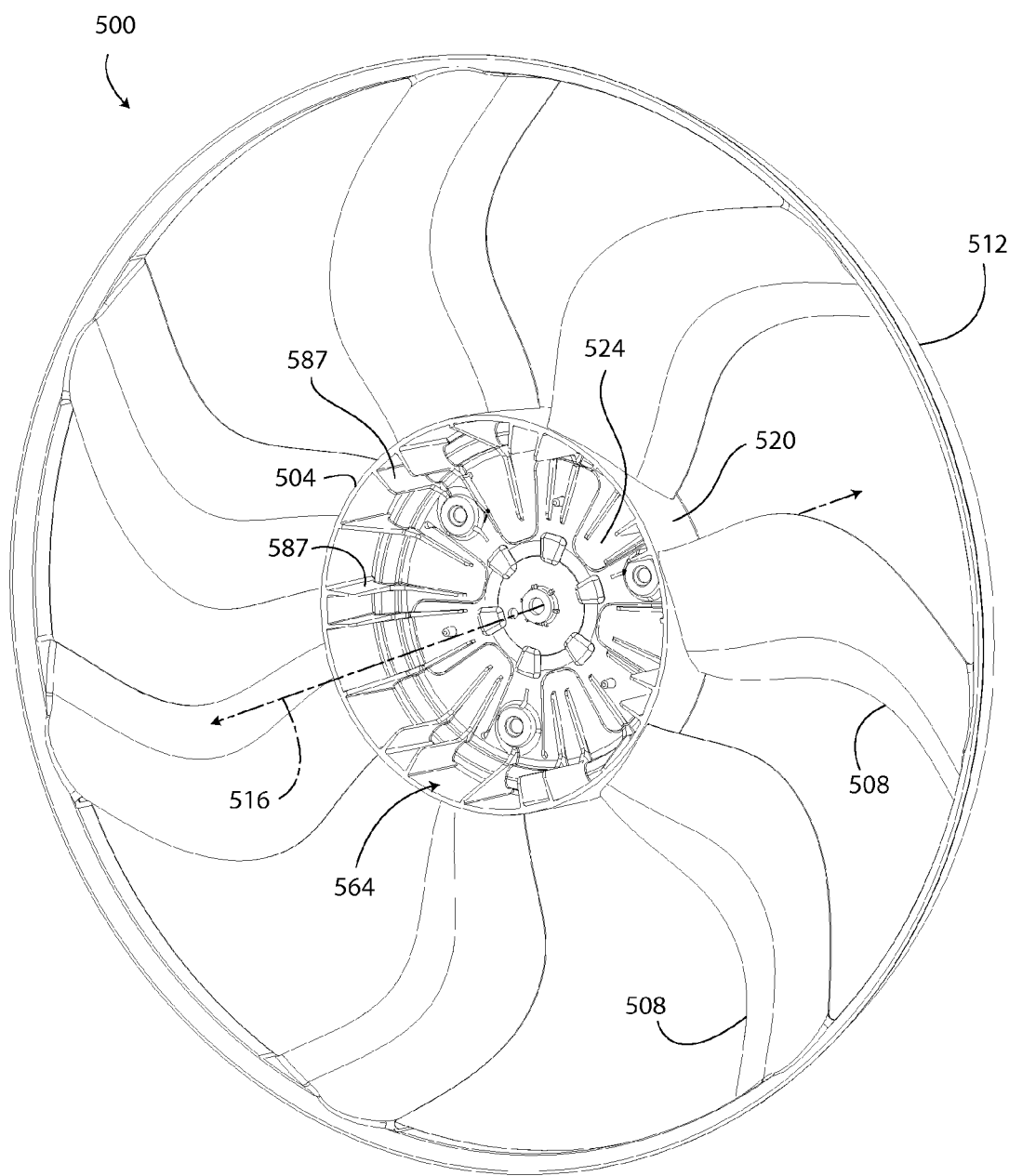
FIG. 18 is a rear perspective view of the axial fan of FIG. 17.
Figure 19:
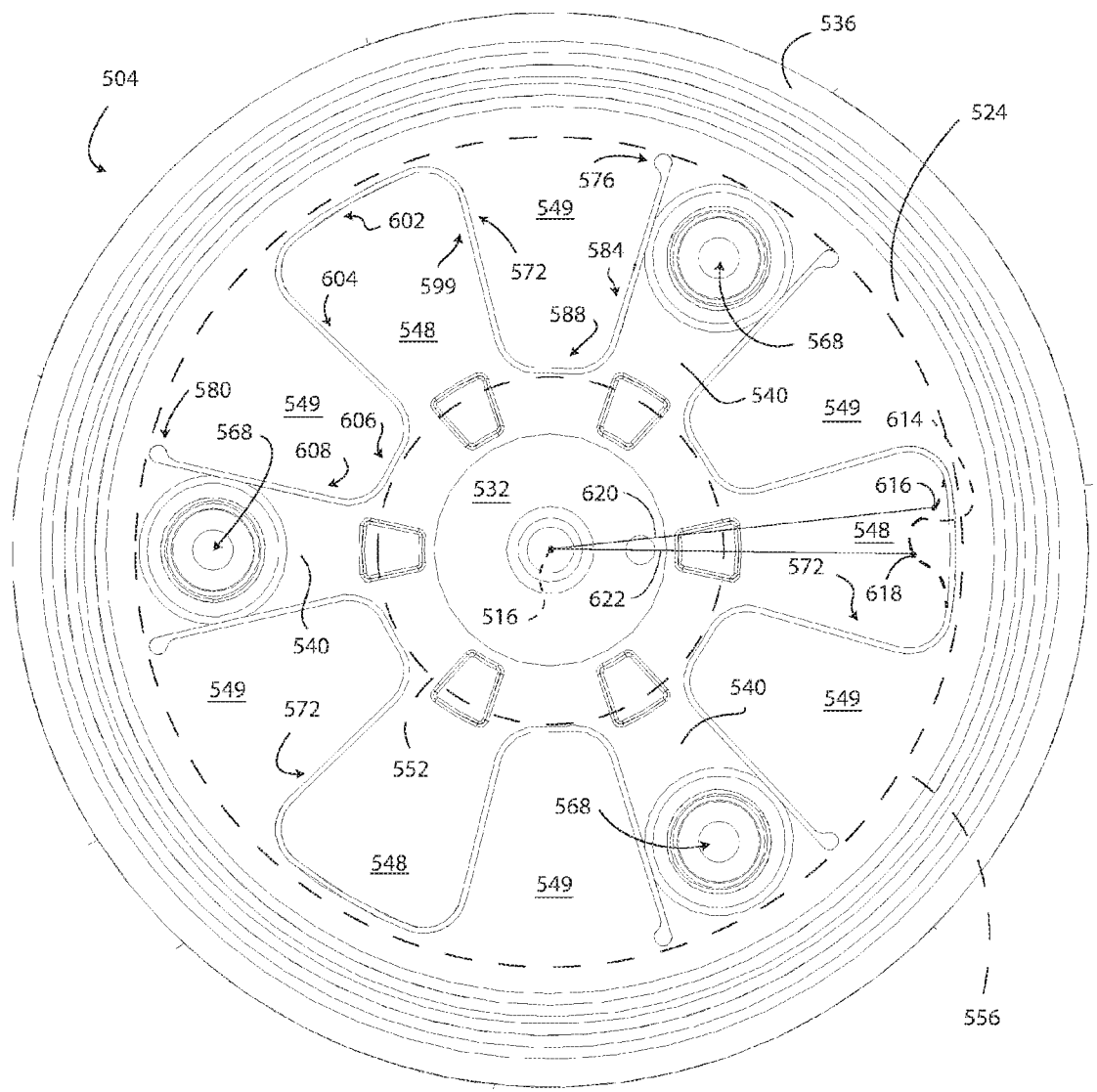
FIG. 19 is a front plan view of a hub of the axial fan of FIG. 17 shown in isolation.

As shown in FIGS. 17-19, an axial flow fan 500 includes a hub 504, blades 508 extending radially outward from the hub, and a band 512 connected to the tips of each of the blades. Rotation of the fan 500 causes the blades 508 to generate an airflow, which is coaxial with an axis of rotation 516 of the fan.

The hub 504 includes a cylindrical portion 520 connected to a face 524. The cylindrical portion 520 extends axially rearward from the face 524, in a direction parallel to axis of rotation 516. The hub 504 defines a hub cavity 564 (FIG. 18) in which at least a portion of the electric motor 177 is positioned. The hub 504 and each other portion of the fan 500 are formed from injection molded thermoplastic.

With reference to FIG. 19, the face 524 includes a radially inward face portion 532 and a radially outward face portion 536. The inward face portion 532 extends radially between the axis of rotation 516 and a boundary line 552. The outward face portion 536 extends radially outwardly from a boundary line 556.

The fan 500 includes connection structures 540, isolated members 548, and isolated members 549 positioned between the inward face portion 532 and the outward face portion 536. The fan 500 includes three of the connection structures 540, which connect the outward face portion 536 to the inward face portion 532. The connection structures 540 extend radially outwardly from the inward face portion 532 and extend radially inwardly from the outward face portion 536. Additionally, the connection structures 540 extend generally perpendicularly from the axis of rotation 516. The connection structures 540 are distributed uniformly about the axis of rotation 516, such that there is approximately 120° of separation between the connection structures. The connection structures 540 each define an aperture opening 568 to receive a fastening member, which connects the fan 500 to the electric motor 177.

The isolated members 548 are directly connected to the inward face portion 532 and extend radially outwardly from the axis of rotation 516. As shown in FIG. 19, the fan 500 includes three of the isolated members 548. The isolated members 548 are approximately trapezoid-shaped. Each isolated member 548 is isolated from the outward face portion 536, the connection structures 540, and the isolated members 549 by a slot 572.

The isolated members 549 are directly connected to the outward face portion 536 and extend radially inwardly toward the axis of rotation 516. As shown in FIG. 19, the fan 500 includes six of the isolated members 549. The isolated members 549 are approximately trapezoid-shaped. Each isolated member 549 is isolated from the inward face portion 536, the connection structures 540, and the isolated members 548 by one of the slots 572.

When the fan 500 is connected to the electric motor 177, the isolated members 548, 549 are also isolated from the electric motor, meaning that the isolated members do not contact the electric motor. The isolated members 548, 549 are flexible and movable with respect to the outward face portion 536, the inward face portion 532, the connection structures 540, and the cylindrical portion 520 due in part to the resiliency of the thermoplastic from which the fan 500 is formed.

With reference to FIG. 19, the fan 500 includes three of the slots 572, which extend along the face 524 radially and circumferentially and extend completely through the face. Each of the slots 572 is partially defined by a circular portion 576 and a circular portion 580. The slot 572 centered about the eleven o'clock position in FIG. 20 includes a radial leg 584 that extends radially inwardly from the beginning portion 576. Next, the slot 572 includes a circumferential leg 588 which is connected to an outwardly extending radial leg 599. The radial leg 599 is followed by another circumferential leg 602 and then another inwardly extending radial leg 604. The radial leg 604 is connected to another circumferential leg 606, which is followed by another outwardly extending radial leg 608.

As shown in FIG. 18, the fan 500 includes ribs 587 extending from the hub 504 and arrayed about the axis of rotation 516. Specifically, the ribs 587 extend axially rearward from the face 524 and extend radially inwardly from the cylindrical portion 520. The ribs 587 are distributed about the hub 504 to structurally reinforce the face 524 and the cylindrical portion 520. Additionally, the ribs 587 generate a cooling airflow through or around the motor 177.

With reference again to FIG. 19, the isolated member 548 located at approximately the three o'clock position includes an alternative radially outer edge 614 (shown in phantom). The radially outer edge 614 is non-linear and is positioned a non-constant distance from the axis of rotation 516. Accordingly, a first point 616 on the edge 614 is positioned a first distance 620 from the axis of rotation 516 and a second point 618 on the edge 614 is positioned a second distance 622 from the axis of rotation 516, the first distance 620 being greater than the second distance 622.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An axial fan assembly, comprising:
a hub rotatable about an axis of rotation and including a radially extending face and a cylindrical portion extending axially from said face, said face including a radially inner face portion and a radially outer face portion;
a plurality of connection structures extending radially outwardly from said radially inner face portion and extending radially inwardly from said radially outer face portion; and
a plurality of isolated members extending radially outwardly from said radially inner face portion, said plurality of isolated members being isolated from said plurality of connection structures and said radially outer face portion by a plurality of slots,
wherein a first isolated member of said plurality of isolated members has a first radially outer edge,
wherein a second isolated member of said plurality of isolated members has a second radially outer edge,
wherein said first radially outer edge has a first arc length,
wherein said second radially outer edge has a second arc length, and
wherein said first arc length is greater than said second arc length.

2. The axial fan assembly of claim 1, further comprising:
a plurality of connection tabs extending radially inwardly from said radially outer face portion,
wherein each connection tab of said plurality of connection tabs defines an aperture, and
wherein each of said apertures extends through one of said connection tabs of said plurality of connection tabs.

3. The axial fan assembly of claim 1, wherein at least one connection structure of said plurality of connection structures defines an aperture extending through said at least one connection structure.

4. The axial fan assembly of claim 1, further comprising:
a plurality of ribs extending axially rearward from said face and extending radially inwardly from said cylindrical portion.

5. The axial fan assembly of claim 1, further comprising:
a plurality of membrane structures, each membrane structure of said plurality of membrane structures being positioned between said inner face portion and a corresponding isolated member of said plurality of isolated members,
wherein said plurality of membrane structures enables movement of said plurality of isolated members relative to said outer face portion, said inner face portion, and said plurality of connection structures,
wherein each membrane structure of said plurality of membrane structures at least partially defines a groove, and
wherein said plurality of membrane structures at least partially prevents an airflow from passing through said face.

6. An axial fan assembly, comprising:
a hub rotatable about an axis of rotation and including a radially extending face and a cylindrical portion extending axially from said face, said face including a radially inner face portion and a radially outer face portion;

a plurality of connection structures extending radially outwardly from said radially inner face portion and extending radially inwardly from said radially outer face portion; and a plurality of isolated members extending radially outwardly from said radially inner face portion, said plurality of isolated members being isolated from said plurality of connection structures and said radially outer face portion by a plurality of slots, wherein said plurality of slots is a first plurality of slots, wherein a portion of each isolated member of said plurality of isolated members is separated from said radially inner face portion by a second plurality of slots, and wherein a radially outward portion of at least one of said isolated members is separated from a radially inward portion of said one of said isolated members by at least one slot of a third plurality of slots.

7. An axial fan assembly, comprising:

a hub rotatable about an axis of rotation and including a radially extending face and a cylindrical portion extending axially from said face, said face including a radially inner face portion and a radially outer face portion;

a plurality of connection structures extending radially outwardly from said radially inner face portion and extending radially inwardly from said radially outer face portion; and a plurality of slots extending through said face and extending radially and circumferentially to define a plurality of isolated members, each isolated member of said plurality of isolated members being directly connected to one of said radially inner face portion and said radially outer face portion, and each isolated member of said plurality of isolated members being isolated from said plurality of connection structures and isolated from one of said radially inner face portion and said radially outer face portion, wherein a first isolated member of said plurality of isolated members includes a first radially outer edge, wherein a second isolated member of said plurality of isolated members includes a second radially outer edge, wherein said first radially outer edge has a first arc length, wherein said second radially outer edge has a second arc length, and wherein said first arc length is greater than said second arc length.

8. The axial fan assembly of claim 7, wherein said plurality of isolated members extends radially outwardly from said radially inner face portion.

9. The axial fan assembly of claim 7, wherein:

said plurality of isolated members includes a first plurality of isolated members and a second plurality of isolated members, said first plurality of isolated members extends radially outwardly from said radially inner face portion, and said second plurality of isolated members extends radially inwardly from said radially outer face portion.

10. The axial fan assembly of claim 7, wherein at least one connection structure of said plurality of connection structures defines an aperture extending through said at least one connection structure.

11. The axial fan assembly of claim 7, wherein:

each slot of said plurality of slots is defined by a first slot edge and a second slot edge, said first slot edge is a fixed distance from a center of said face, and said second slot edge is said fixed distance from said center of said face.

12. The axial fan assembly of claim 7, wherein:

said plurality of slots is a first plurality of slots, and a portion of each isolated member of said plurality of isolated members is separated from said radially inner face portion by a second plurality of slots.

13. The axial fan assembly of claim 12, wherein a radially outward portion of at least one of said isolated members of said plurality of isolated members is separated from a radially inward portion of said one of said isolated members by at least one slot of a third plurality of slots.

14. The axial fan assembly of claim 7, further comprising:

a plurality of ribs extending axially rearward from said face and extending radially inwardly from said cylindrical portion.

15. The axial fan assembly of claim 7, further comprising:

a plurality of blades extending radially outwardly from said cylindrical hub portion.

16. The axial fan assembly of claim 15, further comprising:

a band connected to each blade of the plurality of blades.

* * * * *